United States Patent [19]

Simic

[11] 4,210,458
[45] Jul. 1, 1980

[54] PLASTICIZED SULFUR WITH IMPROVED THIXOTROPY

[75] Inventor: Militun Simic, Novato, Calif.

[73] Assignee: Chevron Research Company, San Francisco, Calif.

[21] Appl. No.: 965,126

[22] Filed: Nov. 30, 1978

Related U.S. Application Data

[63] Continuation of Ser. No. 670,036, Mar. 24, 1976, abandoned.

[51] Int. Cl.$^2$ .............................................. C09K 3/00
[52] U.S. Cl. ........................... 106/287.23; 106/287.32; 423/567 R
[58] Field of Search ............. 528/389; 106/70, 287.23, 106/287.32, 19; 423/567

[56] References Cited

U.S. PATENT DOCUMENTS 3,960,585  6/1976  Gaw ................................ 106/287.18

FOREIGN PATENT DOCUMENTS 1154540  6/1969  United Kingdom ..................... 423/567

Primary Examiner—Theodore Morris
Attorney, Agent, or Firm—D. A. Newell; John Stoner, Jr.; A. T. Bertolli

[57] ABSTRACT

A method of preparing a plasticized sulfur composition of increased viscosity as compared to a mixture of molten sulfur and remelted plasticized sulfur concentrate, which comprises including and mixing 0.01 to 5 weight percent of a $C_2$-$C_{25}$ saturated polyhydric alcohol with the mixture. The concentrate used herein is obtained by combining sulfur and a sulfur plasticizer and then solidifying. Preferably the viscosity is increased sufficiently by the inclusion of the polyhydric alcohol so that the mixture of remelted concentrate and added sulfur will not give substantial sagging upon spraying onto a vertical wall in a thickness of about 1/16 inch.

12 Claims, No Drawings

PLASTICIZED SULFUR WITH IMPROVED THIXOTROPY

CROSS-REFERENCE TO RELATED APPLICATION

This application is a continuation of U.S. Ser. No. 670,036, filed Mar. 24, 1976 now abandoned.

BACKGROUND OF THE INVENTION

The present invention relates to a plasticized sulfur composition of improved thixotropy; in particular, a sulfur composition of increased viscosity prepared by including a $C_2$–$C_{25}$ saturated, polyhydric alcohol in a plasticized sulfur mixture which is obtained by remelting a plasticized sulfur concentrate with added molten sulfur.

Plasticized sulfur mixtures are disclosed in various references. For example, J. I. Jin gives the following tabular comparison of plasticized sulfur compositions in his report given at the ACS Los Angeles meeting, Symposium on New Sulfur Chemistry, Apr. 19, 1974, page 235:

| COMPARISON OF PLASTICIZED SULFUR COMPOSITIONS | | |
|---|---|---|
| Plasticizer | Melt Viscosity Regulator | (Reference) |
| Mixture of dithiol and higher thiols | Chlorinated Polyphenyls | (2) |
| Arylenepolysulfide (ZM-399)* and aliphatic polysulfide (LP-3)** | None | (3,6) |
| OH<br>\|<br>H—(SCH$_2$CH$_2$CH$_2$S)—nH and styrene | Diphenyl dithiophosphate | (4) |
| Dithol | Monomercaptan | (5) |

*Thiokol's styrene polysulfide
**Thiokol's liquid polysulfide
(2)Louthan, R.P., U.S. Pat. No. 3,434,852 (March 1969).
(3)Barnes, M.D., U.S. Pat. No. 3,316,115 (April 1967).
(4)Signouret, J.B., U.S. Pat. No. 3,560,451 (February 1971).
(5)Kane, J.C., U.S. Pat. No. 3,447,941 (June 1969).
(6)Dale, J.M., Report No. 1 (September 1961); Report No. 2 (April 1962); Report No.3 (June 1963), Project 1092-2, Southwest Research Institute.

Other reports of interest given at the above ACS Symposium on New Sulfur Chemistry include that by B. R. Currell et al, "Plasticization of Sulphur", which report was concerned with a study of the chemical interaction of additives (such as polymeric polysulfides, unsaturated hydrocarbons and phenolic derivatives) with sulfur and also measurement, using differential scanning calorimetry and electron microscopy, of the rate of crystallization of sulfur in the presence of these additives. Limonene, myrcene, dicyclopentadiene and cycloocta-1,3-diene were found particularly effective in retarding sulfur crystallization. Other reports at the ACS Symposium of interest include that by T. A. Sullivan et al, "The Use of Sulfur in Coatings and Structural Materials". The Sullivan et al report describes use of a sulfur formulation in construction of a cinder block building where the blocks were stacked dry and bonded together by spraying with the formulation.

U.S. Pat. No. 3,453,125 describes modifiers to reduce the viscosity of plasticized sulfur. According to the patent, the viscosity of plasticized sulfur compositions comprising elemental sulfur plasticized with an organic sulfur-plasticizing agent is reduced by the addition of a modifying amount of a persulfide of the formula $$A—R—S_x—R—A$$

wherein each R is a hydrocarbon radical having up to about 10 carbon atoms, at least one A is hydroxyl or carboxyl and x is an integer of from 2 to about 5.

According to U.S. Pat. No. 3,674,525, the viscosity of plasticized sulfur compositions comprising elemental sulfur plasticized with an organic sulfur-plasticizing agent is reduced by the addition of a modifying amount of an unsaturated acid or unsaturated acid anhydride to the plasticizing agent prior to its use for plasticizing sulfur.

U.S. Pat. No. 3,676,166 relates to viscosity control agents for thinning or reducing the high viscosity of molten plasticized sulfur wherein the control agent is selected from the group consisting of 1,2,4-trichlorobenzene; biphenyl; naphthalene; o-dichlorobenzene; p-dichlorobenzene; or xylene.

Other patents of interest include U.S. Pat. Nos. 3,371,072, 3,465,064, 3,560,451, 3,823,019, and 3,447,941. The last patent is concerned with sulfur roadmarking compositions stable against degradation by heat and having a viscosity sufficiently low to permit application by spraying. The compositions comprise from about 40% to 96% elemental sulfur, from about 1% to about 20% of a sulfur-containing plasticizer, from about 0.05% to about 10% of a chain-terminating compound and from 0% to about 30% of a filler. The chain-terminating compound can be a monomercaptan, a monobasic acid monomercaptan, a polysulfide, or styrene. The monomercaptan is of the formula RSH, wherein R is selected from acyl and hydroxyalkyl of from 2 to 20 carbon atoms inclusive.

SUMMARY OF THE INVENTION

According to the present invention a method is provided for preparing a plasticized sulfur composition of increased viscosity compared to a mixture of molten sulfur and remelted plasticized sulfur concentrate which comprises including and mixing 0.01 to 5 weight percent of $C_2$–$C_{25}$ saturated polyhydric alcohol with the molten mixture of remelted concentrate and sulfur, wherein the concentrate is obtained by combining sulfur and a sulfur plasticizer and then solidifying.

The present invention also contemplates the compositions resulting from the method, in molten or solid form. Thus, according to the present invention there is contemplated plasticized sulfur of improved thixotropy produced by steps comprising mixing 0.01–5 weight percent of a $C_2$–$C_{25}$ saturated polyhydric alcohol with a molten mixture of remelted concentrate and sulfur, wherein the mixture comprises a sulfur plasticizer and at least 50 weight percent sulfur.

Preferably the plasticized sulfur composition of this invention is prepared by steps including the preparation of a concentrate from sulfur, a sulfur plasticizer and an inorganic filler, followed by remelting the concentrate with added sulfur.

Among other factors, the present invention is based on my finding that the viscosity of a sulfur composition prepared by mixing molten sulfur with a remelted concentrate of sulfur, is less than that of a composition having the same relative amounts of sulfur, a sulfur plasticizer and a filler, but prepared directly from these ingredients; and that this loss in viscosity can be overcome by the addition of a polyhydric alcohol to the molten sulfur-remelted concentrate mixture. The present invention is also based on: (i) my finding that in making a sulfur concentrate (e.g., for shipping to a point where more sulfur is to be added) and subsequently remelting the plasticized sulfur concentrate with added sulfur results in a viscosity that is too low, so that sagging occurs upon spraying the remelted concentrate and sulfur onto a vertical surface or the like; and (ii) my finding that if a polyhydric alcohol as described herein is included in the formulation, the viscosity is increased sufficiently to substantially reduce or avoid the sagging problem.

The viscosity of the materials can be measured by a Brookfield viscometer test. In this test, the drag produced upon a spindle rotating at a definite, constant speed while immersed in the test substance is measured. The test is carried out using a Brookfield Viscometer distributed by the Brookfield Engine Laboratories, Inc., of Stoughton, Mass. This apparatus has multiple spindles of various sizes and a means for rotating a spindle at a constant, predetermined speed.

Without the added alcohol, the viscosity curves for the mixture of remelted concentrate and added molten sulfur have been found to be generally flat, with increasing RPM's in the Brookfield test. For example, without the added alcohol, the viscosity may be about 500 centipoises, plus or minus 50 centipoises, from 30 to 60 RPM with a #3 spindle. Thus, not only is the viscosity relatively low, but also the thixotropy is relatively low. (It should be noted that the viscosity, of course, also varies with temperature, but the temperature for a viscosity measurement is to be understood to be at about 145° C. for all viscosity measurements herein, unless otherwise indicated).

For the remelted concentrate plus added molten sulfur and containing the polyhydric alcohol, the viscosity curve is found to be relatively steep as a function of RPM's. Thus, the following table can be given as illustrative for the mixture containing a polyhydric alcohol, and carried out in the same way as the above-described test with sulfur-sulfur concentrate only.

| RPM | Viscosity, cp |
|---|---|
| 5 | 3500 |
| 12 | 2400 |
| 30 | 1800 |
| 60 | 1200 |

The alcohol may be added to the concentrate before the remelting of the concentrate with the added sulfur, or after, or at the same time as the remelting of the concentrate with the added sulfur. However, it is preferred to add the polyhydric alcohol to the molten blend of sulfur and remelted sulfur concentrate followed by stirring in the molten state for 5 minutes up to 24 hours prior to application.

The present invention is particularly concerned with plasticized sulfur compositions which are suitable for spraying onto a vertical surface or the like, but yet avoiding substantial sagging or running of the plasticized sulfur which is sprayed onto the surface in molten form. Thus, preferably the adjustment of type and amount of saturated polyhydric alcohol is made so that the viscosity of the mixture of remelted concentrate and added sulfur is sufficient so that the mixture will not give substantial sagging upon spraying onto a vertical wall in a thickness of about 1/16 inch. By "sagging" or "running" is meant runs which are readily discernible by visual inspection with the naked eye. Also, suitable test conditions for ascertaining whether the composition is substantially nonsagging includes a spray coverage rate of about 12 square feet per minute, at a temperature for the molten mixture in the spray container of about 145° C., and with a spray pattern from the spray nozzle covering an area of about 2 inches by 18 inches at a distance of about 24 inches from the surface being sprayed.

According to a preferred embodiment of the present invention, the concentrate comprises at least 10 weight percent sulfur, the mixture of remelted concentrate and added sulfur contains at least 50 weight percent sulfur and at least 10 weight percent more sulfur than the concentrate, and the mixture also contains 0.1 to 50, preferably about 1 to 20, weight percent of an inorganic filler, and wherein the viscosity is increased, compared to the viscosity of the mixture without alcohol, by at least 500 centipoises at an RPM of 6 in a Brookfield viscometer test.

Sulfur is the major ingredient of the final mixture of the present invention, and is present in an amount above about 50 weight percent, generally between 60–98 weight percent, and preferably between about 70–97 weight percent. The sulfur concentrate, of course, contains much less sulfur, but typically it contains at least 10 weight percent sulfur, more usually 25–60 weight percent sulfur. The mixture of the sulfur concentrate and added sulfur preferably contains at least 10 weight percent more sulfur than the concentrate, more usually at least 20–40% more sulfur than the concentrate, and preferably 50–350% more sulfur than the concentrate.

The concentrate is prepared in molten form at a temperature above the melting point of the concentrate, usually a temperature between 110°–180° C., preferably between about 125°–150° C. Likewise, the remelting of the concentrate with the added sulfur is usually carried out at a temperature between about 110°–180° C., preferably between about 125°–150° C.

The mixture of the present invention includes a sulfur plasticizer. Plasticizers are well known in the sulfur art (see Alberta Sulfur Research, Ltd., Quarterly Bulletin, Vol. VIII, No. 4, January–March 1972) and frequently include compounds having one or more sulfur atoms in the molecule.

Plasticized sulfur usually has a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: The test material (0.040 g) is melted on a microscope slide at 130° C. and is then covered with a square microscope slide cover slip. The slide is transferred to a hotplate and is kept at a temperature of 78°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to or reacted with molten elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in U.S. Pat. No. 3,892,686) required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materials, such as styrene, alpha-methylstyrene, dicyclopentadiene, vinyl cyclohexene, the aromatic compound-sulfur adducts of U.S. Pat. No. 3,892,686, as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compounds are styrene and the phenol-sulfur adduct of U.S. Pat. No. 3,892,686.

The preferred aliphatic compounds are dicyclopentadiene and linear polysulfides. When phenol is used as the plasticizer, in order to obtain plasticization it is necessary to get the phenol to react with the sulfur; this reaction can advantageously be effected using base catalysis, e.g., using sodium hydroxide.

Preferably the mixture produced in accordance with the present invention includes an inorganic filler such as mica, asbestos fibers, talc, glass fibers, or a mixture of the foregoing such as a mixture of asbestos and talc. Other mineral fillers, as for example used in the paint industry, are satisfactory. For instance, calcium carbonate, calcium sulfate, and silicates can be used. Particularly suitable inorganic fillers and/or "dispersing agents" used to disperse fibrous materials such as asbestos and to avoid lumpiness are described in amounts and type in my commonly assigned applications Ser. No. 518,438 filed Oct. 29, 1974, and Ser. No. 529,258 filed Dec. 3, 1974.

Preferred alcohols for use in the preparation of the mixture in accordance with the present invention are those alcohols having a boiling point in excess of 120° C. and more preferably are solids at 25° C. Particularly preferred alcohols include diols such as ethylene glycol, diethylene glycol, 1,4-butanediol, 1,2-propanediol, etc.; triols such as glycerine, trimethylol methane, 1,2,3-trimethylolpropane, 1,1,1-trimethylolethane, etc.; tetraols such as erythritol, D- and L-threitol, tetramethylolmethane, 1,2,3,4-tetrahydroxybutane, 1,2,3,4-tetrahydroxycyclopentane, etc.; and polyols such as the hydrogenated pentoses and hexoses, e.g. sorbitol, mannitol, inositol, arabinitol, glucitol, rhamnitol, talitol, iditol, ribitol, xylitol, allitol, galactitol, etc. Preferably the amount of alcohol included in the mixture is 0.01 to 5 weight percent of the mixture of remelted concentrate and sulfur, more preferably 0.05 to 0.5% by weight of the mixture. Most preferably the amount of alcohol is 0.10–0.3% by weight of the mixture.

EXAMPLES

EXAMPLE 1

A sulfur coating composition was prepared by heating 180 parts of sulfur to 140°–150° C. and then adding 3.6 parts of dicyclopentadiene, 12.8 parts of talc (Mistron Vapor), and 3.6 parts of milled glass fibers (Owens-Corning 0.25 inch). The resulting mixture was heated for one hour at this temperature. Then viscosity measurements were taken on a Brookfield Viscometer. The results are given in Table I. Parts and percentages in this specification are by weight unless indicated otherwise.

EXAMPLE 2

A concentrate was prepared by heating 80 parts of sulfur to 140°–150° C. and then adding 3.6 parts of dicyclopentadiene, 12.8 parts of talc (Mistron Vapor), and 3.6 parts of milled glass fibers (Owens-Corning 0.25 inch). The entire mixture was stirred at this temperature for one hour. It was then poured into a mold and cooled to room temperature.

EXAMPLE 3

The above-prepared concentrate (Example 2), 100 parts, was added to 100 parts of molten sulfur. When the resulting mixture had become homogenous, the Brookfield viscosity measurements were taken. The results are shown in Table I. Thus this Example 3 preparation had the same composition as the Example 1 preparation.

EXAMPLE 4

To a portion of the product of Example 3, 10 parts, was added 0.02 part of sorbitol; and the resulting mixture was stirred for five minutes at 145° C. Then a series of Brookfield viscosity measurements were taken. The results are given in Table I.

EXAMPLE 5

This example was carried out essentially the same as Example 4, except that the 0.02 part of sorbitol was replaced with 0.05 part of glycerol. Viscosity results are given in Table I.

EXAMPLE 6

Another concentrate was prepared by heating 87.50 parts of sulfur to 140°–150° C. and then adding 2.25 parts of dicyclopentadiene, 8.00 parts of talc (Mistron Vapor), and 2.25 parts of milled glass fibers (Owens-Corning 0.25 inch). The resulting mixture was heated and stirred at 140°–150° C. for one hour. It was then poured into a mold and cooled to room temperature.

EXAMPLE 7

The concentrate of Example 6, 800 parts, was added to 200 parts of molten sulfur at 150° C. The resulting mixture, which had the same percentage composition as Examples 1 and 3, was heated and stirred at 140°–150° C. for one-half hour. Then viscosity measurements were made using the Brookfield viscometer. The results are given in Table II.

EXAMPLE 8

To a portion of the product of Example 7, 100 parts, was added 0.1 part of sorbitol. The resulting mixture was stirred at 150° C. for five minutes. Then viscosity measurements were made. The results are given in Table II.

EXAMPLE 9

The procedure of Example 8 was followed, except that the 0.1 part of sorbitol was replaced by 0.15 part of sorbitol. The viscosity measurements are given in Table II.

EXAMPLE 10

The procedure of Example 9 was followed, except that the mixture was stirred at 140°–160° C. for 24 hours before the viscosity measurements were taken. The results are given in Table II.

TABLE I
EFFECT OF POLYHYDRIC ALCOHOLS ON SULFUR COATING VISCOSITIES

| Example No. | Additive, % | Viscosity,[1] cps, at | | | |
|---|---|---|---|---|---|
| | | 6 rpm | 12 rpm | 30 rpm | 60 rpm |
| 1 | None[2] | 3200 | 2000 | 1200 | 900 |
| 3 | None[3] | 1300 | 850 | 750 | 450 |
| 4 | Sorbitol, 0.2 | 4200 | 2600 | 1430 | 950 |
| 5 | Glycerol, 0.5 | 7200 | 4300 | 2200 | 1350 |

[1]Brookfield viscosity at 145° C., using a No. 3 Spindle.
[2]Base composition prepared directly, without an intermediate concentrate step.
[3]Same composition as in Example 1, but prepared from sulfur and a sulfur concentrate.

TABLE II
EFFECT OF POLYHYDRIC ALCOHOLS ON SULFUR COATING VISCOSITITES

| Example No. | Additive, % | Viscosity,[1] cps, at | | | |
|---|---|---|---|---|---|
| | | 6 rpm | 12 rpm | 30 rpm | 60 rpm |
| 1 | None[2] | 3200 | 2000 | 1200 | 900 |
| 7 | None[3] | 1940 | 1270 | 760 | 520 |
| 8 | Sorbitol, 0.1 | 2800 | 1730 | 900 | 600 |
| 9 | Sorbitol, 0.15 | 3500 | 2250 | 1260 | 850 |
| 10 | Sorbitol, 0.15[4] | 2900 | 2000 | 1270 | 960 |

[1]Brookfield viscosity at 145° C., using a No. 3 spindle.
[2]Base composition prepared directly, without an intermediate concentrate stage.
[3]Same composition as in Example 1, but prepared from sulfur and a sulfur concentrate.
[4]Same as Example 9, except heated for 24 hours before viscosity measurements.

I claim:

1. A method of preparing a plasticized sulfur composition from a molten mixture of solidified preformed plasticized sulfur concentrate and sulfur, which comprises mixing the preformed sulfur concentrate in the molten state with molten sulfur in the presence of 0.01 to 5 weight percent of a $C_2$-$C_{25}$ saturated polyhydric alcohol thereby to increase the viscosity of the molten plasticized sulfur concentrate-sulfur mixture by at least 500 centipoises at an RPM of 6 using a No. 3 spindle in a Brookfield Viscometer test at 145° C., the plasticized sulfur concentrate in the preformed state comprising at least 10 weight percent sulfur, and the molten plasticized sulfur concentrate-sulfur mixture comprising at least 50 weight percent sulfur and at least 10 weight percent more sulfur than the plasticized sulfur concentrate.

2. A method in accordance with claim 1 wherein the molten plasticized sulfur concentrate-sulfur mixture contains in addition 0.1 to 10 weight percent of an inorganic filler.

3. A method in accordance with claim 2, wherein the polyhydric alcohol is selected from the group consisting of glycerine and hydrogenated pentoses and hexoses.

4. A method in accordance with claim 3 wherein the alcohol is a hydrogenated pentose or hexose.

5. A method in accordance with claim 3 wherein the alcohol is glycerine.

6. A method in accordance with claim 4 wherein the amount of alcohol is 0.05 to 1.0 weight percent of said mixture.

7. A method in accordance with claim 4 wherein the sulfur plasticizer is an aromatic polysulfide or an aliphatic polysulfide or a mixture thereof.

8. A method in accordance with claim 7 wherein the sulfur plasticizer is the reaction product of phenol and sulfur.

9. A method in accordance with claim 7 wherein the sulfur plasticizer is dicyclopentadiene.

10. A method in accordance with claim 8 wherein the plasticizer is phenol polysulfide.

11. A method in accordance with claim 4 wherein the plasticizer is dicyclopentadiene.

12. A method in accordance with claim 9 wherein the plasticizer is an aliphatic polysulfide polymer which has the recurring unit —$S_xCH_2CH_2OCH_2OCH_2CH_2S_x$—.

* * * * *